United States Patent [19]

Long

[11] 4,262,558
[45] Apr. 21, 1981

[54] APPARATUS FOR SHARPENING CIRCULAR SAW BLADES

[76] Inventor: Donald S. Long, 207 Kelso Ct., Cary, N.C. 27511

[21] Appl. No.: 76,855

[22] Filed: Sep. 19, 1979

[51] Int. Cl.³ .............................................. B63D 63/14
[52] U.S. Cl. ...................................................... 76/37
[58] Field of Search ................. 76/43, 42, 37; 51/225, 51/230, 231, 232

[56] References Cited

U.S. PATENT DOCUMENTS

| 2,534,470 | 12/1950 | Murphy | 76/37 |
| 2,970,499 | 2/1961 | Pridemore | 76/43 |
| 3,583,260 | 6/1971 | Bond | 76/43 |
| 3,766,806 | 10/1973 | Benner | 76/42 |
| 3,815,446 | 6/1974 | Murphy | 76/43 |

Primary Examiner—Nicholas P. Godici
Assistant Examiner—Roscoe V. Parker
Attorney, Agent, or Firm—Mills & Coats

[57] ABSTRACT

The present invention relates to an apparatus that is adapted to be attached adjacent to a conventional grinding machine for sharpening circular saw blades, especially the type having laterally off set teeth. The sharpening attachment of the present invention basically comprises a connecting bracket, an elongated blade support member adjustably secured to said bracket and provided with a movable traveler that is adapted to be secured to a saw blade to be sharpened. The traveler is actuated back and forth so as to bring the saw blade into sharpening engagement and disengagement with a sharpening stone forming a part of said grinding machine. In the method utilized in the case of a circular saw blade having laterally off set teeth, when secured within the sharpening attachment, every other tooth would assume a lowermost position and these teeth are first sharpened. Then the blade is turned over and the other teeth are sharpened in a like manner. Particularly, the saw blade through the blade support member is moved back and forth into and out of engagement with the sharpening stone.

14 Claims, 8 Drawing Figures

APPARATUS FOR SHARPENING CIRCULAR SAW BLADES

The present invention relates to devices for supporting and guiding a cutting device while being sharpened, and more particularly to a circular saw blade support and guide assembly for supporting a circular saw blade and guiding the blade into and out of engagement with an adjacent sharpening stone.

BACKGROUND OF INVENTION

A review of the prior art reveals that there has long been a need for a sharpening device for circular saw blades. For example, one is referred to the disclosures in the following U.S. Pat. Nos. 2,534,470; 3,766,806; 2,970,499; 3,583,260; and 3,815,446.

While many of these sharpening devices will most likely perform an adequate job, most are characterized as being very sophisticated and relatively complex machines. Such machines are clearly too expensive to be practical for the typical carpenter or handyman.

Circular saw blades are expensive and for the carpenter who makes his living in construction, it is very practical and prudent to sharpen circular saw blades after becoming dull rather than discarding them and buying new ones. Generally this is done by a hand file because, again, most circular saw blade sharpening devices are too sophisticated and expensive to be practical and feasible. The hand filing of circular saw blades on the other hand is not desirable because such is a laborious and time consuming chore.

Thus, there is a real need for a relatively inexpensive and simple sharpening device for circular saw blades.

SUMMARY OF INVENTION

The present invention entails a simple and relatively inexpensive sharpening attachment designed to work in conjunction with a conventional grinding machine for sharpening circular saw blades. Basically, the sharpening attachment of the present invention comprises a mounting bracket that is adapted to be adjustably mounted adjacent the sharpening stone of a grinding machine, and a circular saw blade support and guide assembly that is adjustably secured to the mounting bracket and extends therefrom. Associated with the blade support and guide assembly is a traveler that is adapted to secure the circular saw blade about the support member, and the traveler is movably mounted such that the circular saw blade can be moved back and forth into and out of engagement with a grinding stone or wheel.

In the present invention, two basic embodiments are disclosed. In one embodiment, the circular saw blade is secured about one side to the traveler and by the provision of an actuating rod secured to the traveler, the circular saw blade is pushed back and forth into and out of engagement with the grinding wheel or stone. In the second embodiment, the circular saw blade support and guide structure is pivotably mounted about a transverse axis adjacent the grinding stone or wheel and by raising and lowering the blade support and guide structure respective teeth of the blade are brought into and out of sharpening engagement with the grinding stone.

The present invention entails a method of sharpening circular saw blades also. In this regard, the method of the present invention is particularly suited for circular saw blades of the type having laterally off set teeth, that is every other tooth is off set to one side of the circular saw blade. When disposed about the blade support member adjacent the sharpening stone, only the lowermost teeth are sharpened, one tooth at a time. Then, the blade is turned over to where the former uppermost teeth now assume a position of the lowermost teeth, and then they, one tooth at a time, are sharpened.

It is therefore, an object of the present invention to provide a circular saw blade sharpening attachment of the type adapted to be utilized in conjunction with a conventional grinding machine, which is relatively simple and inexpensive.

A further object of the present invention resides in the provision of a circular saw blade sharpening attachment that is capable of accommodating different size circular saw blades, and which is easy and safe to use.

Another object of the present invention is to provide a circular saw blade sharpening attachment of the character described above that is provided with adjustment means in order that the sharpening attachment can be easily and quickly adjusted relative to the sharpening stone in order to assure properly sharpened teeth.

Yet another object of the present invention resides in the provision of a circular saw blade sharpening attachment that is designed to sharpen one tooth at a time by moving the saw blade into and out of engagement with an adjacent sharpening stone, and wherein the sharpening attachment is designed such that each and every tooth is sharpened in a like and uniform manner.

Still a further object of the present invention is to provide a method of sharpening a circular saw blade of the type having laterally off set teeth wherein the method basically comprises sharpening every other tooth, being the lowermost teeth, while the blade is secured about one side, and then turning the blade over and securing it about the other side and sharpening the other teeth which now assume the lowermost position.

Other objects and advantages of the present invention will become apparent from a study of the following description and the accompanying drawings which are merely illustrative of the present invention.

DESCRIPTION OF PREFERRED EMBODIMENT

Figure 1:
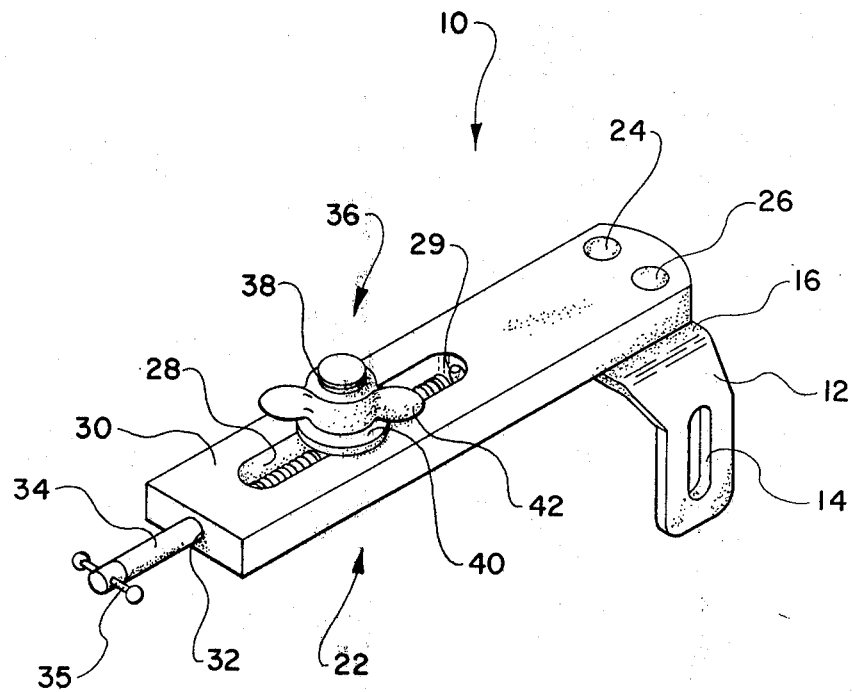
FIG. 1 is a perspective view of a first embodiment of the present invention.
Figure 2:
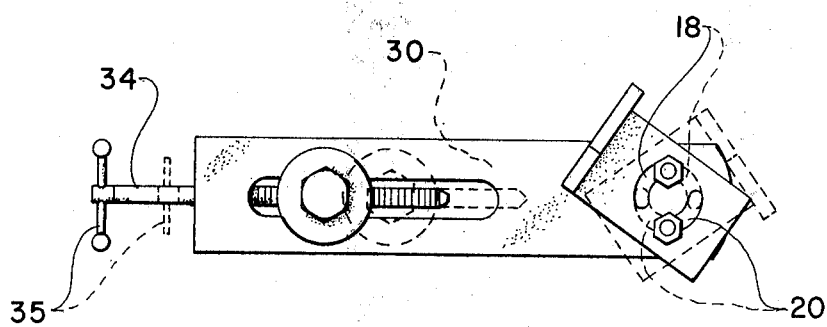
FIG. 2 is a plan view of the bottom of the first species shown in FIG. 1.

With further reference to the drawings, particularly FIG. 1, a first embodiment for the sharpening attachment of the present invention is shown therein and indicated generally by the numeral 10. Sharpening attachment 10 comprises bracket connecting means in the form of a L-shaped bracket that is adapted to be secured to a conventional grinding machine or an associated tool support thereof such that the entire sharpening attachment is disposed closely adjacent the grinding wheel or stone. The bracket connecting means in the form of the L-shaped bracket includes a vertical leg 12 having an elongated slot 14 formed therein that enables the bracket connecting means to be adjusted generally vertically with respect to the grinding machine and particularly the grinding stone of wheel. Extending laterally from leg 12 is a horizontal support arm 16 that is provided with two spaced apart slots 18 and 20. As seen in the drawings, slots 18 and 20 are generally arcuately shaped about a central point therebetween.

Secured to horizontal support arm 16 in cantilever fashion and extending therefrom is a blade support member 22. Blade support member 22 is connected to horizontal support arms 16 through adjustable connecting means that allows the blade support member 22 to be moved from side to side about the horizontal support arm 16. More particularly, the adjustment means is provided through a pair of counter sunken bolt assemblies 24 and 26 that extend through openings in one end of the blade support member 22 and on through slots 18 and 20. It is appreciated that by the provision of the generally arcuate or circular shaped slots, that the entire blade support member 22 can be swung about an axis that extends generally vertically between the two slots 18 and 20.

Viewing the blade support member 22 in more detail, it is seen that the same is basically elongated and includes a voided area or slot 28 and a top blade support surface 30. In addition, at one end there is provided an opening 32 that extends to the open slotted area 28.

Slidably mounted within opening 32 is an actuating member 34 that is threaded about one end and includes a handle 35.

Secured about the threaded portion of said actuating member 34 is a blade carrier device indicated generally by the numeral 36. Blade carrier device 36 comprises a bolt 38 having a threaded opening formed therein through which the threaded portion of the actuating member 34 is threaded through. Therefore, it is appreciated that the position of bolt 38 can be adjusted along the threaded portion of actuating member 34 to accommodate various size circular saw blades.

Continuing to refer to the blade carrier device 36, the same is provided with a retaining washer 40 and wing nut 42.

In operation, a circular saw blade B to be sharpened is inserted about bolt 38 such that the blade lies adjacent surface 30 of the blade support member 22. The wing nut 42 and retaining washer 40 are placed thereover and the blade is, therefore, secured about the blade carrier device 36.

The stroke of actuating member 34 is limited by the engagement of the end within said slotted area 28 engaging extreme end 29 of the slotted area.

After vertical leg 12 has been secured adjacent the grinding wheel GW and the blade support member 22 has been angularly adjusted with respect to the grinding stone for proper sharpening, then the blade carrier device 36 can be adjusted on the actuating member 34 for the size of blade being sharpened. In particular, the same is adjustable such that at the extreme end of the fore stroke, the tooth being sharpened lies adjacent and in contact with the grinding stone.

Figure 3:
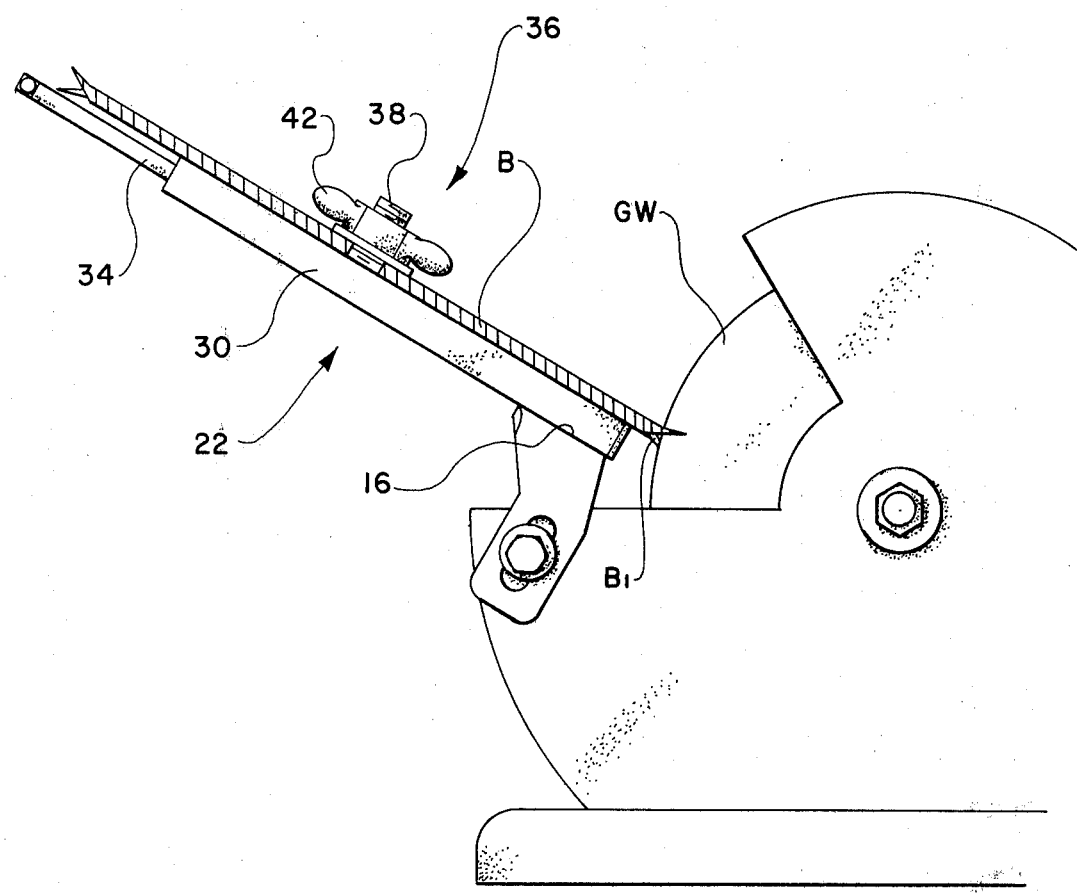
FIG. 3 is a side elevational view of the first species operatively associated with a grinding wheel.
Figure 4:
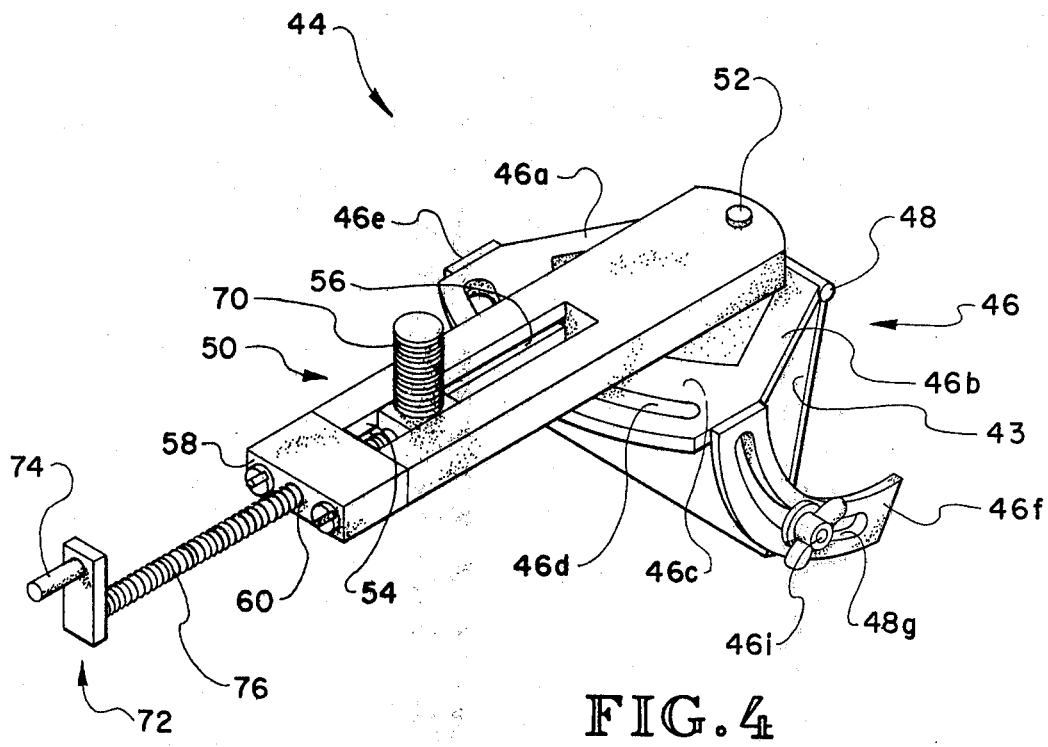
FIG. 4 is a perspective view of a second species of the present invention.
Figure 5:
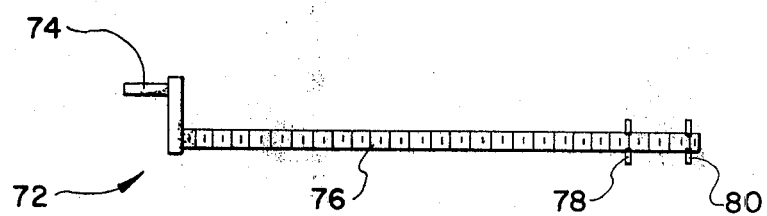
FIG. 5 is a side elevational view of the screw actuating member of the second species.
Figures 6, 7:
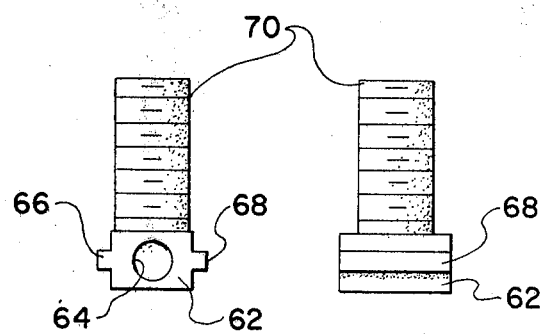
FIGS. 6 and 7 are side elevational views of the blade carrier member of the second species.
Figure 8:
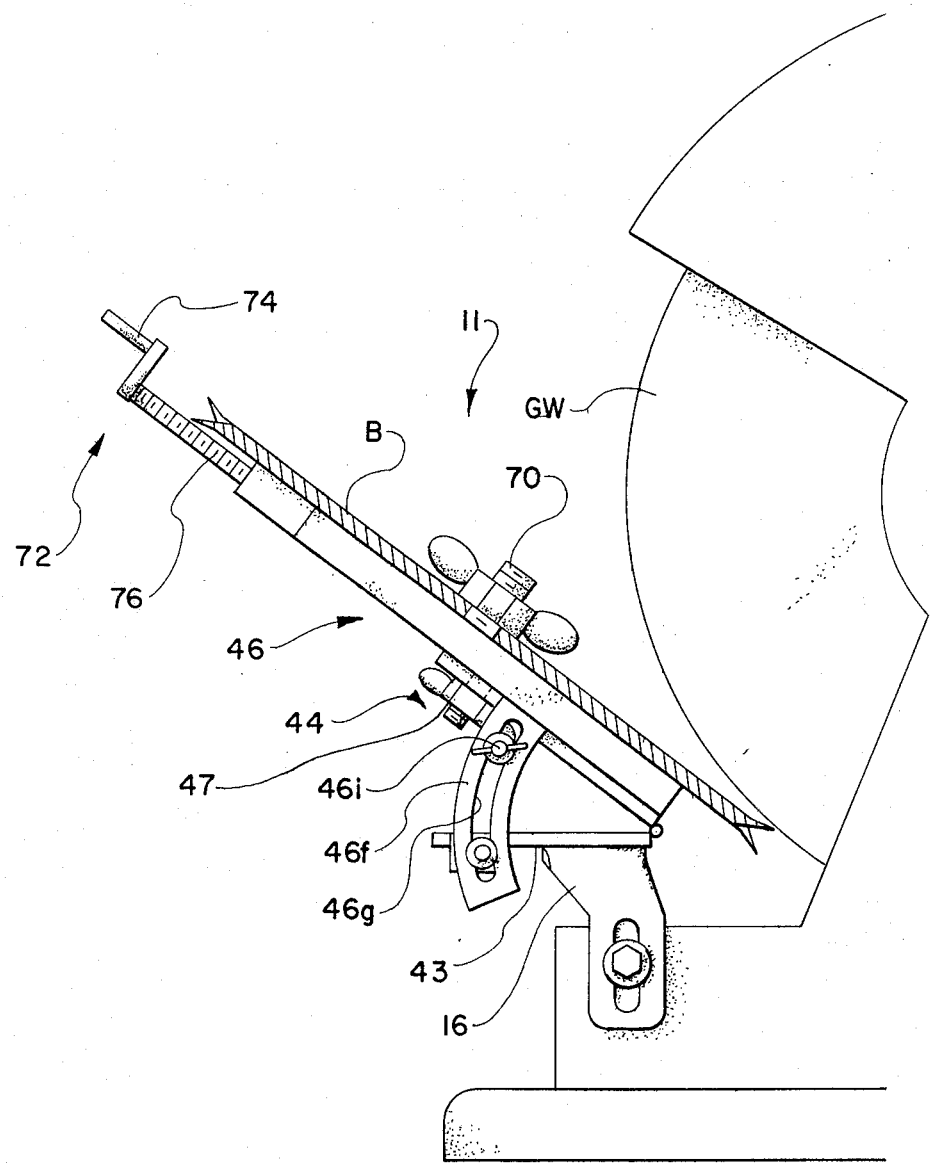
FIG. 8 is a side elevational view of the second species operatively associated with a grinding wheel.

Sharpening device 10 is contemplated to be used to sharpen circular saw blades, and is particularly useful with the type of blade having laterally off set teeth. That is, every other tooth around the circumference of the blade is off set to the same side, as illustrated in FIG. 3. In such a case, once the blade B is secured about the blade carrier device 36, the lowermost teeth $B_1$ are sharpened first because the grinding wheel will be turning downwardly towards the teeth. Consequently, after each tooth is sharpened, the actuating member 34 is pulled back and the blade rotated to the next lowermost tooth and secured, and then the actuating member is pushed inwardly towards the sharpening stone until the end of the actuating member 34 engages stop 29. This process is continued around the saw blade until all of the lowermost teeth have been sharpened. Next, the blade is turned over such that the former uppermost teeth now are disposed in the lowermost position. The steps as just outlined are continued until all lowermost disposed teeth are sharpened.

Now turning to a second embodiment, and particularly viewing FIGS. 4 through 8, it is seen that the circular saw blade sharpening attachment 11 is provided with essentially the same connecting bracket means as the first embodiment discussed hereinabove. In this case, it may be preferable for slots 18 and 20 formed in the horizontal arm 16 to simply be straight and elongated. But secured to horizontal arm 16 is a base support member 43 that projects away from the grinding machine. Pivotably connected to the base support member 43 is a blade support assembly indicated generally by the numeral 44 and which includes a main base frame 46. Base frame 46 is pivoted to base support member 43 about a transverse axis indicated by the numeral 48.

Viewing base frame 46 in detail, it is seen that the same is of a generally open type construction and includes a pair of arms 46a and 46b that are joined by an arcuate portion 46c that has formed therein an arcuate shaped slot 46d. In addition about each side of the base frame 46, there is provided a guide and stop leg 46e and 46f. In the embodiment disclosed, legs 46e and 46f are generally curved and each is provided with an elongated curved slot 46g. Slot 46g is provided with an adjustable stop assembly 46i and the significance of this will be understood from subsequent portions of the disclosure.

Specifically, each stop assembly 46i is adjustable within slot 46g and cooperative with base support member 43 in order that the degree of pivotable movement of the base frame 46 can be selectively restricted with respect to base support member 43.

Forming a part of the blade support assembly 44 is a blade support member 50 that is pivotably mounted to base frame 46 about axis 52 that extends generally perpendicular with respect to transverse axis 48. Blade support member 50 generally extends along the top of base frame 46 and is provided with a guide stud 47 that generally projects into slot 46d of base frame 46 such that as the blade support member is rotated about axis 52, the guide stud engages slot 46d and constrains the support member 50 to swing about axis 52.

Continuing to refer to blade support member 50, the same includes a rectangular cutout 54 formed about the end opposite axis 52 and within said cutout 54 there is provided a pair of opposed guide slots 56 formed in the side walls thereof. In addition, there is provided an end cap 58 that is adapted to be bolted to the end of support member 50 adjacent the open portion of the cutout 54. End cap 58 includes a central threaded opening 60.

A traveler 62 including an opening 64 and a pair of flanges 66 and 68 is slidably contained within cutout 54. Flanges 66 and 68 of traveler 62 project into the guide slots 56 and retain traveler 62 within the confines of cutout 54. In addition, a threaded stud 70 is secured by weldment or other suitable means to the traveler 62 and extends upwardly therefrom, and the traveler 62 and stud 70 form the blade carrier device of this embodiment.

To adjust the position of the traveler 62 within cutout 54, there is provided an actuating screw 72 that includes a threaded portion 76 that is threaded into the central threaded opening 60 of end cap 58. In addition actuating screw member 72 includes a crank end 74 and a pair of stops 78 and 80 that are secured about opposite sides of said traveler 62 after the same has been inserted thereon.

Consequently, it is appreciated that traveler 62 and stud 70 can be moved back and forth within cutout 54 by turning the crank end 74 of actuating screw 72. This will adjust the circular saw blade with respect to the blade support 50, and it is appreciated will allow the sharpening attachment 11 of this embodiment to accommodate various size blades.

In use, after the sharpening attachment has been properly mounted adjacent the grinding stone, then the blade is secured about stud 70 extending upwardly from traveler 62 by a retaining washer 40 and wing nut 42 as described in discussing the first embodiment.

Then by adjusting crank handle 74 of actuating screw 72, the position of the saw blade about the blade support member 50 can be adjusted. Next the pivotal movement of base frame 46 is adjusted to a degree where the respective teeth of the circular saw blade come into proper contact with the grinding stone.

After this, the circular saw blade is ready to be sharpened. Once the sharpening stone is turning downwardly towards the blade the blade can be pivoted upwardly into engagement with the sharpening stone. The adjustable stops 46i are set to engage base support member 43 at the lower appropriate limit of travel such that the respective teeth only engage the grinding stone barely enough to effectuate sharpening. After sharpening a respective tooth, the base frame 46 is pivoted upwardly from said base support member 43 and the circular saw blade is rotated to the next appropriate tooth. As in the case of the first embodiment, it is contemplated that the sharpening attachment 11 of this embodiment will be very beneficial in the case of laterally off set teeth, and the same method and technique for sharpening the entire saw blade as described hereinbefore would be utilized.

From the foregoing specification, it is seen that the present invention presents a circular saw sharpening attachment that is practical inasmuch as the same is relatively inexpensive and simple. It is seen that the same can be utilized to effectively sharpen circular saw blades by simply mounting the same adjacent a conventional grinding machine.

The terms "upper", "lower", "forward", "rearward", etc., have been used herein merely for the convenience of the foregoing specification and in the appended claims to describe the sharpening attachment of the present invention and its parts as oriented in the drawings. It is to be understood, however, that these terms are in no way limiting to the invention since the sharpening attachment may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A circular saw blade sharpening attachment adapted to be mounted adjacent a grinding machine having a rotary driven sharpening stone wherein the sharpening attachment acts to support a circular saw blade being sharpened and to guide the blade back and forth into and out of engagement with the sharpening stone, said sharpening attachment comprising:
    (a) connecting bracket means for mounting said sharpening attachment adjacent said sharpening stone of said grinding machine and including means for adjusting said connecting bracket means relative to said sharpening stone;
    (b) a blade support member connected to said connecting bracket means and extending therefrom and including an upper blade resting and sliding surface for supporting respective circular saw blades being sharpened and for enabling the circular saw blades to be moved thereover;
    (c) said blade support member including a voided area formed therein;
    (d) adjustable connecting means interconnecting said blade support member to said connecting bracket means for enabling said blade support member to be moved generally horizontally from side to side relative to said sharpening stone and said connecting bracket means;
    (e) a blade carriage assembly associated with said blade support member and movably mounted thereon for back and forth movement relative to said sharpening stone;
    (f) said blade carriage assembly including an elongated member extending through said blade support member and the voided area therein and movable back and forth therein; and
    (g) a blade carrier device secured to said elongated member and provided with means for securing a circular saw blade thereto such that the circular saw blade is supported about the upper surface of said blade support member and may be moved back and forth therealong by actuating said elongated member, whereby selected teeth on said circular saw blade can be pushed into engagement with said sharpening stone and pulled from engagement therewith by pushing and pulling said elongated member.

2. The sharpening attachment of claim 1 wherein said connecting bracket means includes a generally L-shaped bracket having a vertical connecting leg and a horizontal support arm, with said horizontal support arm acting to receive and support an end portion of said blade support member.

3. The sharpening attachment of claim 2 wherein said adjustable connecting means interconnecting said blade support member and said connecting bracket means comprises a pair of generally elongated slots formed in said horizontal support arm of said L-shaped bracket, and a pair of bolt assemblies operatively interconnected between an end portion of said blade support member and said elongated slots of said horizontal support arm such that said blade support member can be moved from side to side about an axis that extends generally between said slots.

4. The sharpening attachment of claim 3 wherein said slots are generally curved about a point located generally between the two slots.

5. The sharpening attachment of claim 4 wherein said vertical support leg of said L-shaped bracket includes an elongated slot for adjusting the height thereof with respect to said sharpening stone.

6. The sharpening attachment of claim 3 wherein said elongated member of said blade carriage assembly includes a threaded bolt and wherein said blade carrier device is threaded on said bolt and is adjustable along the axis of said bolt so as to give the blade sharpening attachment of the present invention the capability of handling various sizes of circular saw blades.

7. The sharpening attachment of claim 6 wherein said blade carrier device includes a bolt having a threaded hole therein for receiving said threaded bolt forming a part of said elongated member.

8. A circular saw blade sharpening attachment adapted to be mounted adjacent a grinding machine having a rotary driven sharpening stone wherein the sharpening attachment acts to support a circular saw blade being sharpened and to guide the blade to and from engagement with the sharpening stone, said sharpening attachment comprising:
   (a) connecting bracket means for mounting said sharpening attachment adjacent said sharpening stone of said grinding machine;
   (b) a blade support assembly pivotably mounted to said connecting bracket means about a first transverse axis for enabling said blade support assembly to be swung up and down about said first transverse axis;
   (c) said blade support assembly including a base frame and an elongated blade support member pivotably mounted about a second axis that extends generally perpendicular relative to said first transverse axis; and wherein said base frame is provided with means for supporting said elongated blade support member as the same is adjusted and swung about said second axis;
   (d) said elongated blade support member including a voided area formed therein, an elongated screw type actuating member threaded therein and extending through said voided area, and a blade carrier device secured to said elongated screw type actuating member and generally disposed within said voided area such that the same may move back and forth therein, said blade carrier device including means for securing a respective circular saw blade thereto such that the same can be moved back and forth along said elongated blade support member by said elongated screw type actuating member; and
   (e) adjustable stop means associated with said base frame for selectively limiting the pivotable movement of said base frame during the sharpening process, said adjustable stop means including means for prohibiting said base frame from pivoting beyond a selected point about said first transverse axis.

9. The sharpening attachment of claim 8 wherein said voided area of said elongated blade support member is provided with guide slots formed about opposite elongated sides thereof; and wherein said blade carrier device includes a traveler having flanges that project into said guide slots such that said traveler can be moved back and forth within said voided area.

10. The sharpening attachment of claim 9 wherein a threaded stud is secured to said traveler and extends upwardly therefrom such that the respective circular saw blades can be attached thereto.

11. The sharpening attachment of claim 8 wherein said elongated screw type actuating member includes an elongated screw threaded into said elongated blade support member such that the same extends through said voided areas; and wherein said traveler is fixedly secured to said elongated screw such that the same moves fore and aftly within said guide slots as said screw is turned within said blade support member.

12. The sharpening attachment of claim 11 wherein there is provided an end cap secured to the end of said blade support member opposite the second axis, said end cap being provided with a threaded opening for receiving said elongated screw.

13. The sharpening attachment of claim 12 wherein said adjustable stop means comprises arm means secured to said base frame and extended downwardly therefrom and provided with an elongated adjustable slot for receiving a stop device that is adjustably movable therein; and wherein said connecting bracket means is provided with a base support that extends outwardly therefrom below said base frame and cooperates with said adjustable stop means to limit the pivotal movement of said base frame.

14. The sharpening attachment of claim 13 wherein said base frame includes a generally arcutately shaped slot spaced outwardly from said second axis for guiding said blade support member as the same is swung around said second axis.

* * * * *